(12) United States Patent
Jiang et al.

(10) Patent No.: US 12,413,303 B2
(45) Date of Patent: Sep. 9, 2025

(54) SYSTEMS AND METHODS FOR DETERMINING SPECTRUM RESOLVED SNR IN AN ONLINE DENSE WAVELENGTH DIVISION MULTIPLEXING OPTICAL LINK

(71) Applicant: HUAWEI TECHNOLOGIES CO., LTD., Guangdong (CN)

(72) Inventors: Zhiping Jiang, Kanata (CA); Qingyi Guo, Kanata (CA); Xuefeng Tang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/310,200

(22) Filed: May 1, 2023

(65) Prior Publication Data

US 2024/0372612 A1   Nov. 7, 2024

(51) Int. Cl.
 H04B 10/079   (2013.01)
(52) U.S. Cl.
 CPC .............................. H04B 10/07953 (2013.01)
(58) Field of Classification Search
 CPC .................................................. H04B 10/07953
 See application file for complete search history.

(56) References Cited

U.S. PATENT DOCUMENTS

| | | | | |
|---|---|---|---|---|
| 2016/0164599 A1* | 6/2016 | Heismann | ........ | H04B 10/07955 398/29 |
| 2023/0118684 A1* | 4/2023 | Jiang | ................ | H04B 10/07953 398/25 |

OTHER PUBLICATIONS

Zhong et al., "A Robust Reference Optical Spectrum Based in-Band OSNR Monitoring Method Suitable for Flexible Optical Networks", IEEE Photonics Journal, vol. 12, No. 3, Jun. 2020 (Year: 2020).*
R. Schmogrow, "Error Vector Magnitude as a Performance Measure for Advanced Modulation Formats," IEEE Photonics Technology Letters, vol. 24, No. 1, Jan. 1, 2012.
W. Moench, "Measurement of OSNR in coherent systems using polarization multiplexed transmission," TH2A.42, OFC2017.

(Continued)

*Primary Examiner* — Shi K Li
(74) *Attorney, Agent, or Firm* — BCF LLP

(57) ABSTRACT

The disclosed systems and methods for determining spectrum-resolved signal-to-noise ratio (SNR) in an online dense wavelength division multiplexing (DWDM) optical link, the method comprising: i) receiving a noise affected optical signal; ii) converting the received optical signal into a digital signal; iii) processing the digital signal to extract the noise affected transmitted signal; iv) decoding the noise-affected transmitted signal and reconstructing an original transmitted signal; v) converting the noise-affected transmitted signal into frequency domain noise-affected transmitted signal; vi) converting the original transmitted signal into frequency domain original transmitted signal; vii) selecting spectrum slices from the frequency domain noise-affected transmitted signal and the frequency domain original transmitted signal; viii) converting the spectrum slices into time domain portions of the noise-affected transmitted signal and the original transmitted signal respectively; ix) correlating the time domain portions of the noise-affected transmitted signal and the original transmitted signal; and x) determining the spectrum-resolved SNR.

18 Claims, 12 Drawing Sheets

(56) References Cited

OTHER PUBLICATIONS

Francisco Javier Vaquero-Caballero, "Transceiver Noise Characterization Based on Perturbations," JLT, 39(18), 5799 (2021).
S.T. Le et al., "OSNR-Aware Digital Pre-Empasis for High Baudrate Coherent Optical Transmissions", OFC 2022, Optica Publishing Group.

* cited by examiner

SYSTEMS AND METHODS FOR DETERMINING SPECTRUM RESOLVED SNR IN AN ONLINE DENSE WAVELENGTH DIVISION MULTIPLEXING OPTICAL LINK

CROSS-REFERENCE TO RELATED APPLICATIONS

This is the first application filed for the instantly disclosed technology.

TECHNICAL FIELD

The present disclosure generally relates to optical communications and, in particular, to systems and methods for determining spectrum resolved signal-to-noise ratio (SNR) in an online dense wavelength division multiplexing (DWDM) optical link.

BACKGROUND

A typical optical communication system may include various optical components such as, transmitters, receivers, optical multiplexers and demultiplexers configured to combine/separate wavelength channels, optical fibers, optical amplifiers to compensate optical signal power loss due to optical fibers and other components, wavelength selective switch (WSS) to route wavelength channels in mesh optical networks.

Generally, an optical signal (or wavelength channel) travels through an optical link. The optical signal accumulates amplified spontaneous emission (ASE) noise as well as optical fiber nonlinear noise along the way. In order for the optical communication system to operate more efficiently, there is a requirement to monitor optical performance.

There are several operational parameters used to monitor the optical performance. Such operational parameters may include bit error rate (BER), error vector magnitude, optical signal-to-noise ratio (OSNR), generalized OSNR (gOSNR), optical filtering, polarization dependent loss (PDL), polarization mode dispersion (PMD), state of polarization (SOP) or the like. Among various operation characteristics SNR monitoring is of particular significance, more particularly for in-service wavelength channels. Various existing optical performance monitoring techniques are either computationally expensive, required additional hardware, and/or have limited capability to monitor SNR for in-service wavelength channels.

With this said, there is an interest in developing efficient systems and methods for monitoring optical performance for in-service wavelength channels.

SUMMARY

The embodiments of the present disclosure have been developed based on developers' appreciation of the limitations associated with the prior art. The conventional optical performance monitoring techniques are either computationally expensive, required additional hardware, and/or have limited capability to monitor SNR for in-service wavelength channels.

Developers of the present technology have devised methods and systems for determining spectrum resolved signal-to-noise ratio (SNR) in an online dense wavelength division multiplexing (DWDM) optical link.

In accordance with a first broad aspect of the present disclosure, there is provided a method for determining spectrum-resolved SNR in an online DWDM optical link, the method comprising: receiving an optical signal, the received optical signal including a transmitted signal affected by noise; converting the received optical signal into a digital signal; processing the digital signal to extract the noise affected transmitted signal; decoding the noise-affected transmitted signal and reconstructing an original transmitted signal; converting the noise-affected transmitted signal into frequency domain noise-affected transmitted signal; converting the original transmitted signal into frequency domain original transmitted signal; selecting spectrum slices from the frequency domain noise-affected transmitted signal and the frequency domain original transmitted signal; converting the spectrum slices into time domain portions of the noise-affected transmitted signal and the original transmitted signal respectively; correlating the time domain portions of the noise-affected transmitted signal and the original transmitted signal; and determining the spectrum-resolved SNR from the correlation of the time domain portions of the noise-affected transmitted signal and the original transmitted signal.

In accordance with any embodiments of the present disclosure, further comprises selecting different spectrum slices from the frequency domain noise-affected transmitted signal and the frequency domain original transmitted signal; converting the different spectrum slices into different time domain portions of the noise-affected transmitted signal and the original transmitted signal; correlating the different time domain portions of the noise-affected transmitted signal and the original transmitted signal; determining the spectrum-resolved SNR from the correlation of the different time domain portions of the noise-affected transmitted signal and the original transmitted signal; and averaging the spectrum-resolved SNR corresponding to the different spectrum slices and determining the SNR over an entire spectrum of the noise-affected transmitted signal and the original transmitted signal.

In accordance with any embodiments of the present disclosure, the processing the digital signal includes timing recovery, local oscillator frequency offset compensation (LOFO), carrier phase recovery, and equalization.

In accordance with any embodiments of the present disclosure, a relationship between the correlation and the spectrum-resolved SNR is given as:

$$\frac{1}{SNR(f)} = \frac{1}{CORR^2(f)} - 1,$$

where SNR(f) is the spectrum-resolved SNR and CORR(f) is the correlation between the time domain portions.

In accordance with any embodiments of the present disclosure, the correlation CORR(f) between the time domain portions is given as:

$$CORR(f) \equiv \frac{\langle E_{tot}(f,t) E_s^*(f,t) \rangle}{\sqrt{\langle |E_{tot}(f,t)|^2 \rangle} \sqrt{\langle |E_s(f,t)|^2 \rangle}},$$

where $\langle E_{tot}(f,t) E_s^*(f,t) \rangle$ is an expectation operation, $\langle |E_s(f,t)|^2 \rangle$ is a power of the time domain portion of the estimated original signal waveform $E_s^*(f,t)$, $\langle |E_{tot}(f,t)|^2 \rangle$ is a power of the total signal waveform $E_{tot}(f,t)$.

In accordance with any embodiments of the present disclosure, in the event that the extracting of the original transmitted signal is affected by symbol-to-error rate, a relationship between the correlation and the spectrum-resolved SNR is given as:

$$\frac{1}{SNR(f, SER)} = \frac{(1-SER)^2}{CORR^2(f, SER)} - 1$$

where SNR(f,SER) is the spectrum-resolved SNR and CORR(f,SER) is the correlation between the time domain portions, and SER is the symbol-to-error rate.

In accordance with any embodiments of the present disclosure, the noise comprises transceiver noise and DWDM optical link noise.

In accordance with any embodiments of the present disclosure, further comprises segregating the transceiver noise from the DWDM optical link noise.

In accordance with any embodiments of the present disclosure, segregating the transceiver noise from the DWDM optical link noise comprises: altering a shape of the optical signal resulting in an alteration in the DWDM optical link noise; determining the spectrum-resolved SNR based on the altered DWDM optical link noise; measuring a symmetry error in the spectrum-resolved SNR; based on the symmetry error determining the transceiver noise.

In accordance with a second broad aspect of the present disclosure, there is provided a system for determining spectrum-resolved signal-to-noise ratio (SNR) in an online dense wavelength division multiplexing (DWDM) optical link, the system comprising: a non-transitory memory element having instructions thereon; at least one processor coupled to the non-transitory memory element and which execute the instructions to cause the at least one processor to: receive an optical signal, the received optical signal including a transmitted signal affected by noise; convert the received optical signal into a digital signal; process the digital signal to extract the noise affected transmitted signal; decode the noise-affected transmitted signal and reconstruct an original transmitted signal; convert the noise-affected transmitted signal into frequency domain noise-affected transmitted signal; convert the original transmitted signal into frequency domain original transmitted signal; select spectrum slices from the frequency domain noise-affected transmitted signal and the frequency domain original transmitted signal; convert the spectrum slices into time domain portions of the noise-affected transmitted signal and the original transmitted signal respectively; correlate the time domain portions of the noise-affected transmitted signal and the original transmitted signal; and determine the spectrum-resolved SNR from the correlation of the time domain portions of the noise-affected transmitted signal and the original transmitted signal.

In accordance with any embodiments of the present disclosure, the at least one processor is further configured to: select different spectrum slices from the frequency domain noise-affected transmitted signal and the frequency domain original transmitted signal; convert the different spectrum slices into different time domain portions of the noise-affected transmitted signal and the original transmitted signal; correlate the different time domain portions of the noise-affected transmitted signal and the original transmitted signal; determine the spectrum-resolved SNR from the correlation of the different time domain portions of the noise-affected transmitted signal and the original transmitted signal; and average the spectrum-resolved SNR corresponding to the different spectrum slices and determining the SNR over an entire spectrum of the noise-affected transmitted signal and the original transmitted signal.

In accordance with any embodiments of the present disclosure, the processing the digital signal includes timing recovery, local oscillator frequency offset compensation (LOFO), carrier phase recovery, SOP de-rotation, and equalization.

In accordance with any embodiments of the present disclosure, a relationship between the correlation and the spectrum-resolved SNR is given as:

$$\frac{1}{SNR(f)} = \frac{1}{CORR^2(f)} - 1,$$

where SNR(f) is the spectrum-resolved SNR and CORR(f) is the correlation between the time domain portions.

In accordance with any embodiments of the present disclosure, the correlation CORR(f) between the time domain portions is given as:

$$CORR(f) \equiv \frac{\langle E_{tot}(f, t)E^*_s(f, t)\rangle}{\sqrt{\langle |E_{tot}(f, t)|^2\rangle}\sqrt{\langle |E_s(f, t)|^2\rangle}},$$

where $\langle E_{tot}(f,t)E^*_s(f,t)\rangle$ is an expectation operation, $\langle |E_s(f,t)|^2\rangle$ is a power of the time domain portion of the estimated original signal waveform $E^*_s(f,t)$, $\langle |E_{tot}(f,t)|^2\rangle$ is a power of the total signal waveform $E_{tot}(f,t)$.

In accordance with any embodiments of the present disclosure, in the event that the extracting of the original transmitted signal is affected by symbol-to-error rate, a relationship between the correlation and the spectrum-resolved SNR is given as:

$$\frac{1}{SNR(f, SER)} = \frac{(1-SER)^2}{CORR^2(f, SER)} - 1$$

where SNR(f,SER) is the spectrum-resolved SNR and CORR(f,SER) is the correlation between the time domain portions, and SER is the symbol-to-error rate.

In accordance with any embodiments of the present disclosure, the noise comprises transceiver noise and DWDM optical link noise.

In accordance with any embodiments of the present disclosure, the at least one processor is further configured to segregate the transceiver noise from the DWDM optical link noise.

In accordance with any embodiments of the present disclosure, segregating the transceiver noise from the DWDM optical link noise comprises: altering a shape of the optical signal resulting in an alteration in the DWDM optical link noise; determining the spectrum-resolved SNR based on the altered DWDM optical link noise; measuring a symmetry error in the spectrum-resolved SNR; based on the symmetry error determining the transceiver noise.

BRIEF DESCRIPTION OF THE FIGURES

Further features and advantages of the present disclosure will become apparent from the following detailed description, taken in combination with the appended drawings, in which.

Figure 1:
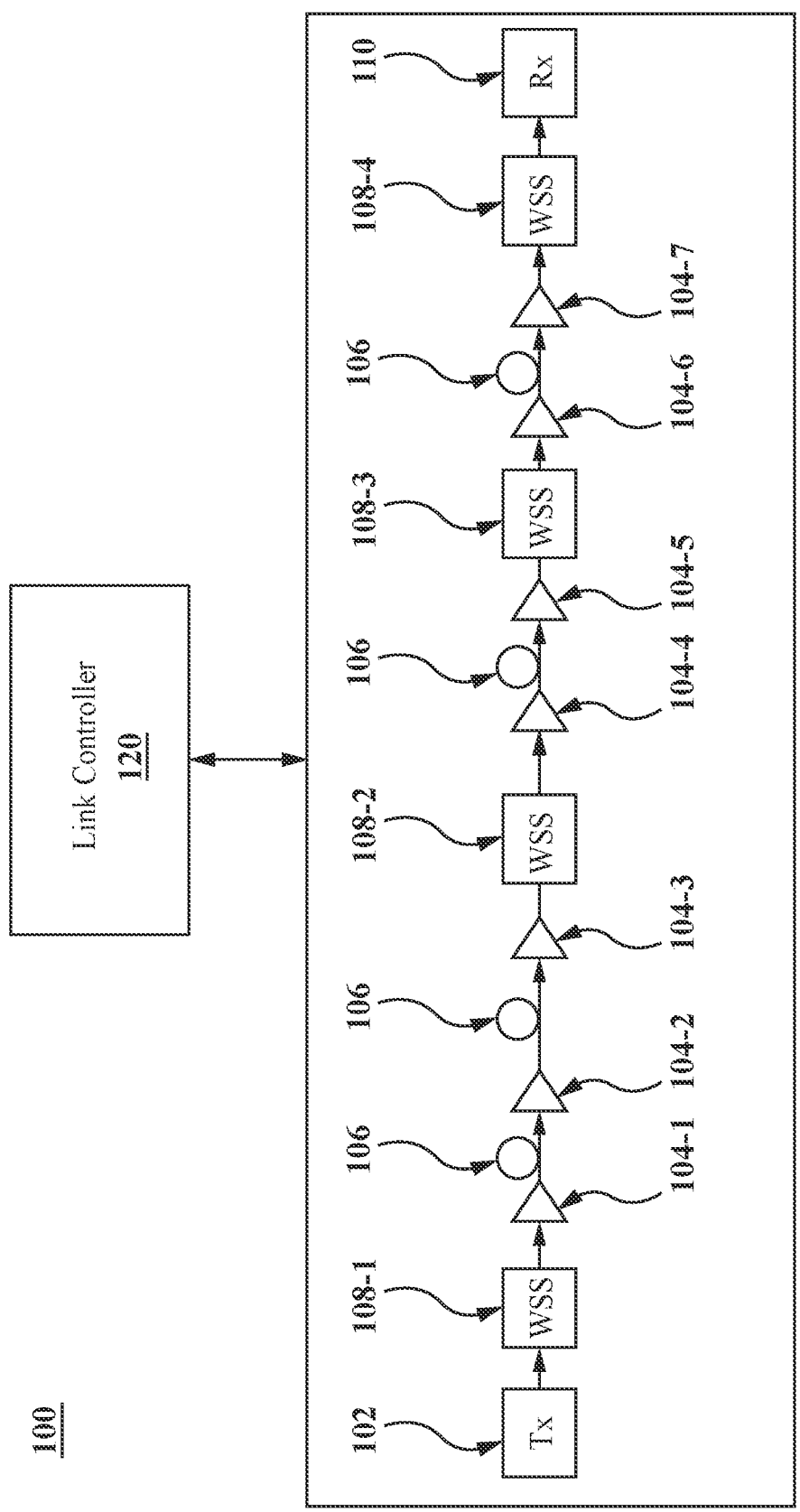
FIG. 1 illustrates a dense wavelength division multiplexing (DWDM) optical link, in accordance with various non-limiting embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for determining spectrum resolved signal-to-noise ratio (SNR) in an online dense wavelength division multiplexing (DWDM) optical link.

As used herein, the term "about" or "approximately" refers to a +/−15% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.).

In the context of the present specification, when an element is referred to as being "associated with" another element, in certain embodiments, the two elements can be directly or indirectly linked, related, connected, coupled, the second element employs the first element, or the like without limiting the scope of the present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations, etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for determining spectrum resolved SNR in an online DWDM optical link.

FIG. 1 illustrates a dense wavelength division multiplexing (DWDM) optical link 100, in accordance with various non-limiting embodiments of the present disclosure. As shown, the DWDM link 100 may include a transmitter 102, optical amplifiers 104-1, 104-2, . . . 104-7, optical fibers 106-1, 106-2, . . . 106-4, wavelength selective switches (WSSs) 108-1, 108-2, . . . 108-4, a receiver 110, and a controller 120. The DWDM optical link 100 may include other components. However, such components have not been illustrated for the purpose of simplicity.

The transmitter 102 may generate data bearing optical signals (interchangeably referred to as wavelength channels) to be transmitted over the optical fibers 106-1, 106-2, . . . 106-4. The optical amplifiers 104-1, 104-2, . . . 104-7 may be located along the optical fibers 106-1, 106-2, . . . 106-4. The optical amplifiers 104-1, 104-2, . . . 104-7 may be used to compensate the loss from the optical fibers 106-1, 106-2, . . . 106-4 and the associated components. It is to be noted that, for the purpose of simplicity only one transmitter 102 and one receiver 110 have been illustrated. However, it will be appreciated that in various non-limiting embodiments, there may be a set of transmitters (each with a unique wavelength) and a set of receivers. The data bearing optical signals from the set of transmitters may be multiplexed by an optical multiplexer on the transmitter side and the multiplexed data bearing optical signals may be demultiplexed by a demultiplexer on the receiver side.

As shown, the WSSs 108-1, 108-2, . . . 108-4 disposed between the transmitter 102 and the receiver 110 may be used to drop and/or add wavelength channels, and route wavelength channels. In certain non-limiting embodiments, the WSSs 108-1, 108-2, . . . 108-4 may act as optical filters. Relatedly, in certain non-limiting embodiments, the WSSs 108-1, 108-2, . . . 108-4 may adjust/equalize the wavelength channel power.

In certain non-limiting embodiments, the DWDM optical link 100 may be implemented as a point-to-point optical link. In other non-limiting embodiments, the DWDM optical link 100 may be incorporated as a portion of a mesh optical network with advanced reconfigurable optical add-drop multiplexers (ROADMs) where the data bearing optical signals may be re-routed to different fibers at ROADM site. The manner in which the DWDM optical link 100 is implemented is not intended to limit the scope of the present disclosure.

In certain non-limiting embodiments, the controller 120 may communicate with other components of the DWDM link 100 such as the transmitter 102, the optical amplifiers 104-1, 104-2, . . . 104-7, the WSSs 108-1, 108-2, . . . 108-4, the receiver 110 or the like. The controller 120 may control functionalities of various components of the DWDM link 100 and may have access to a link topology of the DWDM link 100. Also, the controller 120 may have access to the various link parameters e.g., WSS location, span loss, amplifier gain, amplifier noise figure, input power to amplifier or the like). It is to be noted that where the controller 120 is located in the DWDM link 100 and how the controller 120 communicate with the other components should not limit the scope of the present disclosure.

Figure 2:
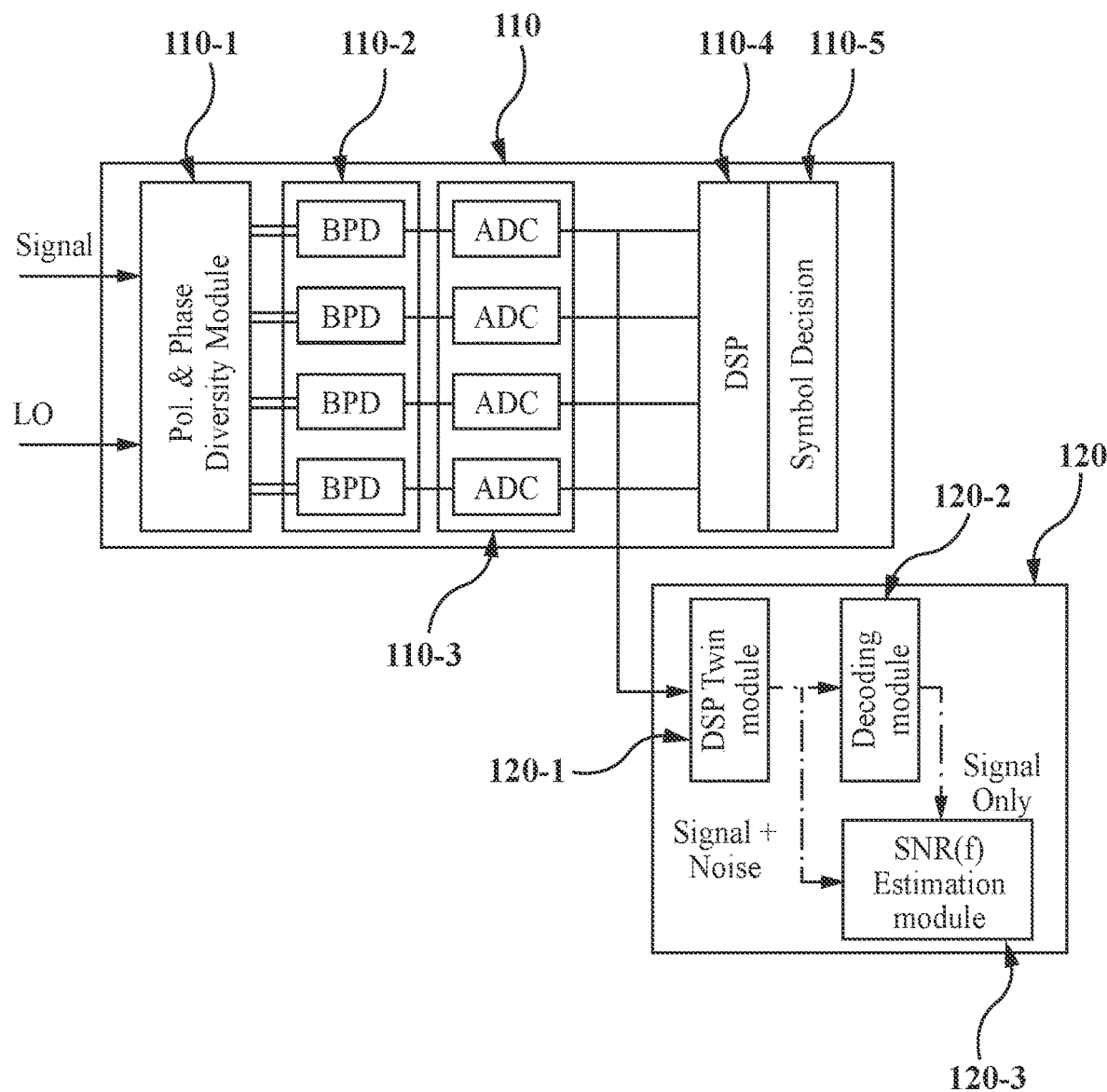
FIG. 2 illustrates a portion of the DWDM link including a receiver and a controller, in accordance with various embodiments of the present disclosure.

FIG. 2 illustrates a portion of the DWDM link 100 including the receiver 110 and the controller 120, in accordance with various embodiments of the present disclosure. The receiver 110 may be configured to receive an optical signal from the DWDM link 100 and process the received optical signal. The optical signal may include a transmitted signal affected by noise. The noise may include transceiver noise and DWDM optical link.

The receiver 110 may include various components to process the received optical signals. Among various components, the receiver 110 may include a polarization and phase diversity module 110-1, balanced photodetectors (BPDs) 110-2, analog-to-digital converters (ADCs) 110-3, a DSP 110-4 and a symbol decision module 110-5. The receiver 110 may include additional components. However, for the purpose of simplicity such components have been omitted from FIG. 2 for the purpose of simplicity.

It is contemplated that the received optical signal may include in-phase and phase quadrature components, such as, for example, XI, YI, XQ, and YQ, the polarization and phase diversity module 110-1 may be configured to segregate the received optical signal in accordance with the polarization diversities. The polarization and phase diversity module 110-1 may provide the polarization segregated optical signals to the BPDs 110-2. The BPDs 110-2 may be configured to convert the polarization segregated optical signals to polarization segregated electrical signals. The BPDs 110-2 may forward the polarization segregated electrical signals to the ADCs 110-3. The ADCs 110-3 may be configured to convert the polarization segregated electrical signals to respective digital signals. The DSP 110-4 may be configured to process the digital signals to decode the included symbols and the symbol decision module 110-5 may be configured to make decisions on the symbols.

In certain embodiments, the ADCs 110-3 may include buffer to store the digital signals. Various embodiments of the present disclosure may rely on this stored buffer data to estimate the spectrum resolved SNR. The spectrum-resolved SNR may be referred to as SNR computed over small bandwidths of the received optical signal.

The controller 120 may be coupled to the ADCs 110-3 and may include various modules, such as for example, a DSP twin module 120-1, a decoding module 120-2, and an SNR estimation module 120-3. It is to be noted that various modules associated with the controller 120 may be implemented as software or hardware without limiting the scope of the present disclosure. Implementation details of the controller 120 will be discussed later in the disclosure.

The controller 120 may be configured to receive the digital signals stored the buffers of the ADCs 110-3 and may estimate the spectrum resolved SNR from the digital signals. To do so, the DSP twin module 120-1 may be configured to process the digital signals in a similar manner as the DSP 110-4 may be processing the digital signals in the receiver 110 and extract noise affected transmitted signal. In other words, processing of the digital signals by the DSP twin module 120-1 may include timing recovery to recover the clock, local oscillator frequency offset compensation (LOFO) to align the local oscillator with the incoming signal, carrier phase recovery, equalization to remove linear impairments, such as chromatic dispersion, SOP rotation, filtering, or the like.

The output of the DSP twin 120-1 may be waveforms that include signal as well as noise. The output of the DSP twin 120-1 may be represented as:

$$E_{tot}(t) = E_s(t) + E_n(t) \quad (1)$$

Where $E_s(t)$ may represent the estimated original signal waveform, $E_n(t)$ may represent the noise waveform, and $E_{tot}(t)$ may represent the total signal waveform (also known as noise affected transmitted signal). The noise affecting the estimated original signal waveform may be the result of transceiver noise, DWDM link noise or a combination of both. The DSP twin module 120-1 may forward the total signal waveform $E_{tot}(t)$ to the decoding module 120-2 and the SNR estimation module 120-3.

The decoding module 120-2 may be configured to decode the total signal waveform $E_{tot}(t)$ to recover the transmitted data included therebetween. From the recovered transmitted data, the decoding module 120-2 may reconstruct the estimated original signal waveform $E_s(t)$. The decoding module 120-2 may forward the estimated original signal waveform $E_s(t)$ to the SNR estimation module 120-3.

The SNR estimation module 120-3 may be configured to estimate the spectrum resolved SNR from the estimated original signal waveform $E_s(t)$ and the total signal waveform $E_{tot}(t)$. First, SNR estimation module 120-3 may compute a normalized correlation between the estimated original signal waveform $E_s(t)$ and the total signal waveform $E_{tot}(t)$. With finite SNR, this correlation may be reduced to less than 1 from 1. The SNR estimation module 120-3 may compute SNR this normalized correlation.

More particularly, to obtain the spectrum resolved SNR, the SNR estimation module 120-3 may convert the time domain estimated original signal waveform $E_s(t)$ and the time domain total signal waveform $E_{tot}(t)$ to frequency domain estimated original signal waveform $E_s(f)$ and the frequency domain total signal waveform $E_{tot}(f)$ using the Fourier transform technique.

Figure 3:
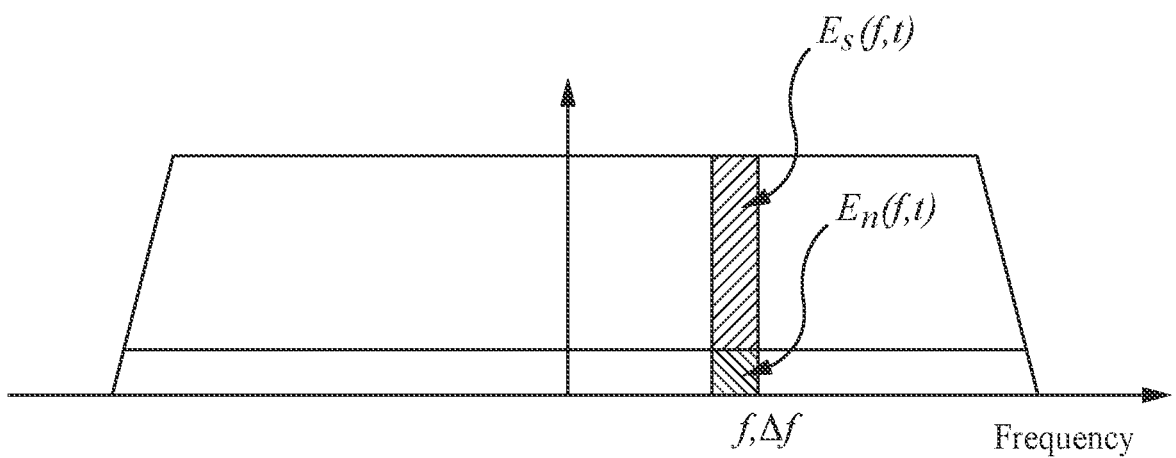
FIG. 3 illustrates spectrum resolved slices selected by a signal-to-noise ratio (SNR) estimation module, in accordance with various embodiments of present disclosure.

After converting the signal waveforms to the frequency domain, the SNR estimation module 120-3 may select spectrum slices from the frequency domain estimated original signal waveform $E_s(f)$ and the frequency domain total signal waveform $E_{tot}(f)$. FIG. 3 illustrates spectrum resolved slices selected by the SNR estimation module 120-3. The SNR estimation module 120-3 may convert the selected slices back to the time domain through inverse Fourier transform. Finally, the SNR estimation module 120-3 may perform correlation between the time domain portions corresponding to the selected spectrum slices.

The correlation between the time domain portions corresponding to the selected slices may be represented as:

$$CORR(f) \equiv \frac{\langle E_{tot}(f,t) E_s^*(f,t) \rangle}{\sqrt{\langle |E_{tot}(f,t)|^2 \rangle} \sqrt{\langle |E_s(f,t)|^2 \rangle}} = \frac{P_s(f)}{\sqrt{P_s(f) + P_n(f)} \sqrt{P_s(f)}} = \frac{1}{\sqrt{1 + 1/SNR(f)}} \quad (2)$$

where $\langle E_{tot}(f,t) E_s^*(f,t) \rangle$ may be an expectation operation, $\langle |E_s(f,t)|^2 \rangle$ may be the power of the time domain portion of the estimated original signal waveform, $\langle |E_{tot}(f,t)|^2 \rangle$ may be the power of the total signal waveform. Based on the correlation, the SNR estimation module 120-3 may compute the spectrum resolved SNR as:

$$\frac{1}{SNR(f)} = \frac{1}{CORR^2(f)} - 1 \quad (3)$$

It is to be noted that the above discussion is with respect to the computing the SNR corresponding to the selected slice of the spectrum. The SNR estimation module 120-3 may compute the spectrum-resolved SNR for the remaining spectrum slices in the frequency resolved time domain estimated original signal waveform $E_s(f,t)$ and the frequency resolved time domain total signal waveform $E_{tot}(f,t)$ using for example a sliding window. The SNR estimation module 120-3 may determine the overall SNR associated with the estimated original frequency resolved time domain signal waveform $E_s(f,t)$ by aggregating the SNRs corresponding to different slices.

It is to be noted that in certain scenarios symbol error rate (SER) may cause reconstruction discrepancy at the decoding module 120-2. Assuming $E_s(t)$ the transmitted signal and $E'_s(t)$ the decoded signal with a symbol error rate SER, the correlation may be reduced from 1 to α and α may be represented as:

$$\alpha = \frac{\langle E_s(t) E_s'^{*}(t)\rangle}{\langle E_s(t) E_s^{*}(t)\rangle} = 1 - SER \quad (4)$$

In such scenarios, the SNR estimation module 120-3 may compute the spectrum resolved SNR as:

$$\frac{1}{SNR(f, SER)} = \frac{(1 - SER)^2}{CORR^2(f, SER)} - 1 \quad (5)$$

Figure 4A:
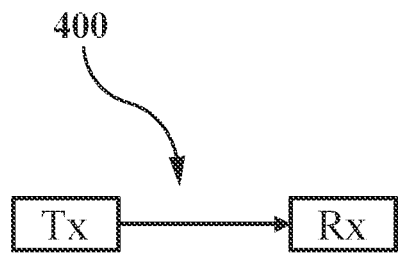
FIGS. 4A and 4B illustrate experimental setups to verify the advantages of various embodiments of the present disclosure.
Figure 4B:
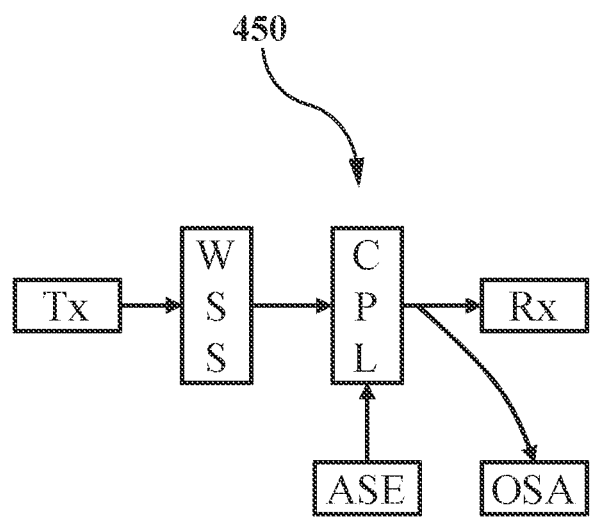
Figure 5:
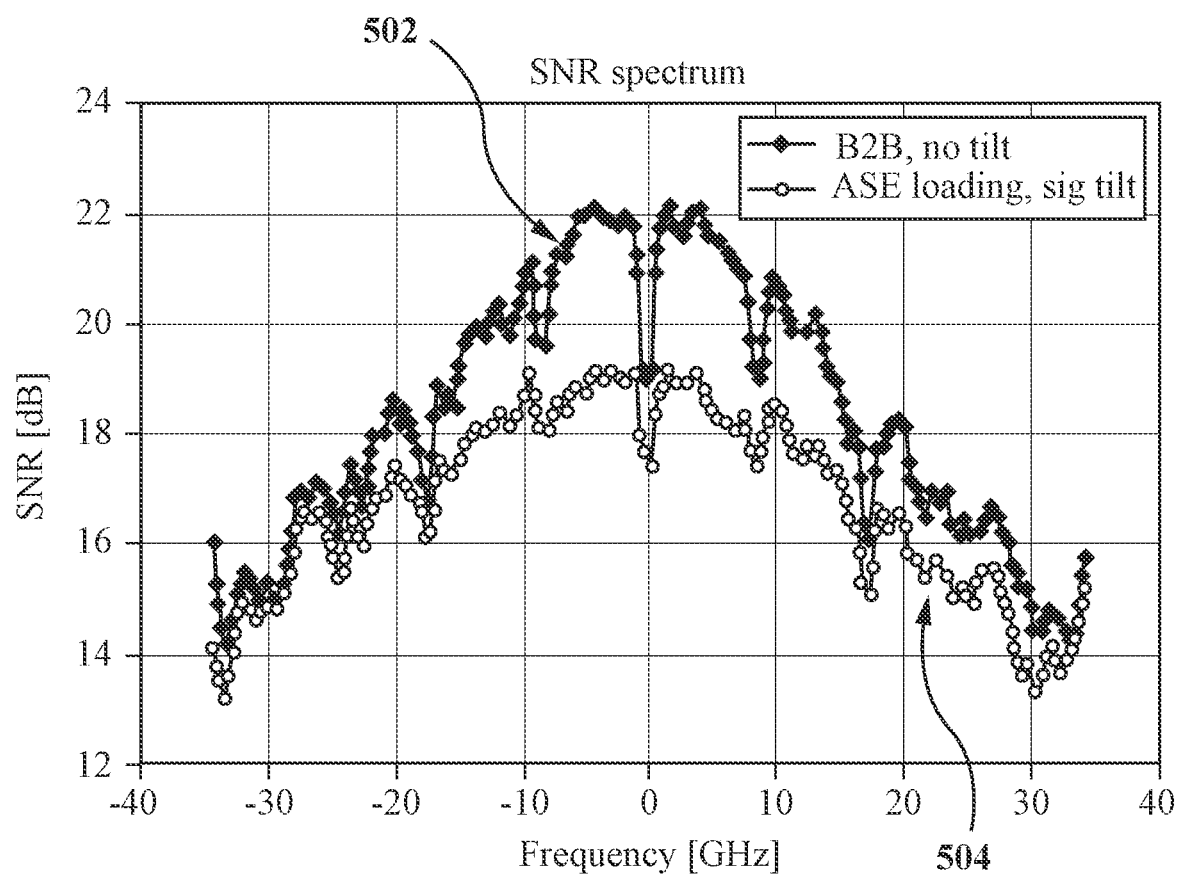
FIG. 5 illustrates measured spectrum resolved back-to-back transceiver configuration SNR, in accordance with various embodiments of the present disclosure.

FIGS. 4A and 4B illustrate experimental setups to verify the advantages of various embodiments of the present disclosure. FIG. 4A illustrates an experimental setup 400 in which a transmitter may be directly coupled to a receiver and a transmitted signal from the transmitter may be directly received by the receiver. The experimental setup 400 may be referred to as back-to-back (B2B) setup and the receiver in this setup may measure the transceiver noise, since there is no added noise in between the transmitter and the receiver. The transmitted signal may be operated at 68 Gbd, and the measured spectrum resolved B2B SNR is illustrated in FIG. 5 using the curve 502.

Figure 6:
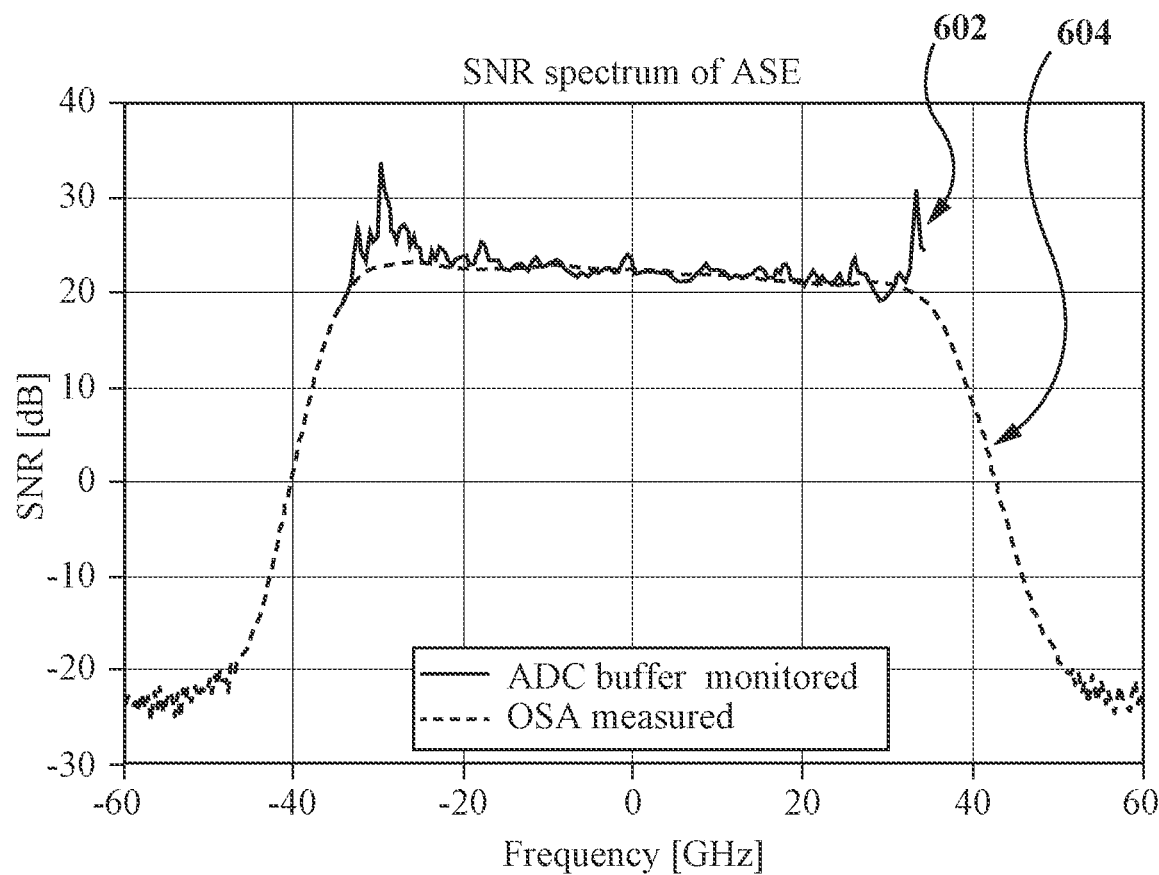
FIG. 6 illustrates measured spectrum resolved amplified spontaneous emission based transceiver configuration SNR, in accordance with various embodiments of the present disclosure.

FIG. 4B illustrates an experimental setup 450 in which an amplified spontaneous noise (ASE) noise may be added to the transmitted signal by a coupler (CPL) and a WSS with a 3.125 GHz resolution may be used to shape the signal spectrum. Further an optical spectrum analyzer (OSA) may be used to measure the signal to ASE ratio (related to OSNR). With added ASE noise, the measured spectrum resolved SNR is shown is illustrated in the FIG. 5 using the curve 504. By subtracting the two curves 502 and 504, the signal to ASE ratio may be derived, which is illustrated in FIG. 6 using the curve 602. As a comparison, the directly measured signal to ASE ratio is also shown in FIG. 6 using the curve 604. The two curves 602 and 604 are almost similar illustrating that the various embodiments of the present embodiments are capable of measuring the spectrum-resolved SNR in an online DWDM link without adding complicated hardware.

Further, in order to accurately determine a quality of transmission (QoT) of a channel, the B2B performance parameter, such as, SNR, of a given Tx/Rx pair may be required to be accurately known. However, it is complicated to compute B2B performance parameters. While the B2B performance parameter may be relatively easy to measure during the manufacturing of Tx/Rx pair, it may be complicated to measure the performance parameter for all possible Tx/Rx pairs when employed online. Moreover, the B2B performance may change due to temperature and ageing. It is therefore highly desirable to develop an online B2B performance monitoring scheme.

As previously noted, the noise received at the receiver along with transmitted optical is composed of mainly two components: i) transceiver noise, and ii) link noise also known as ASE noise. To determine B2B performance parameters in terms of SNR or alternatively in terms of noise-to-signal ratio (NSR), a separation between the two noise components may be required.

Figure 7:
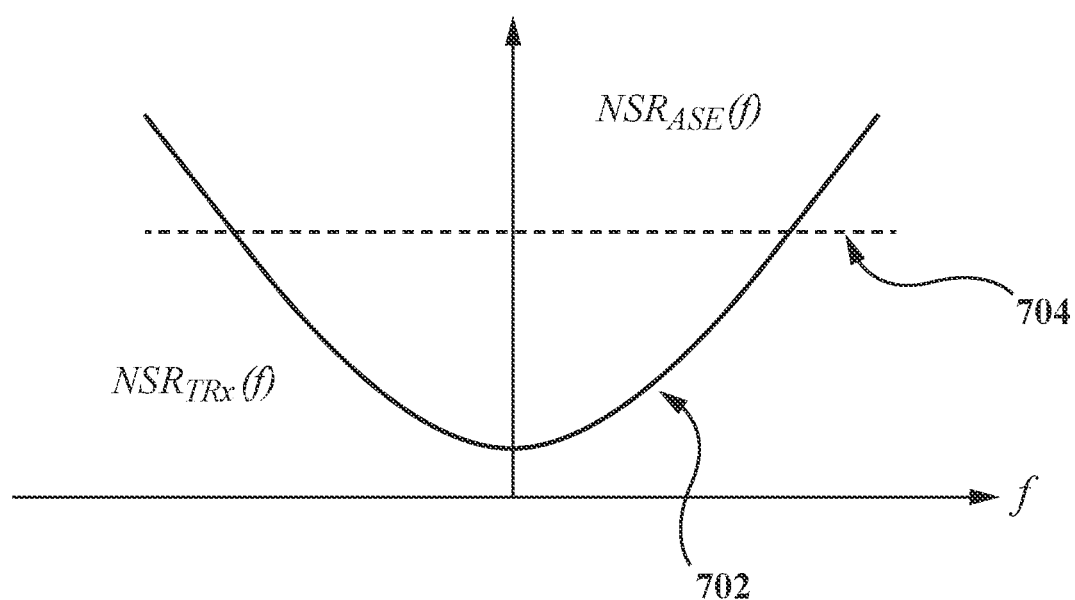
FIG. 7 illustrates a transceiver noise spectrum $NSR_{TRx}(f)$ and an amplified spontaneous emission (ASE)-to-signal spectrum $NSR_{ASE}(f)$, in accordance with various embodiments of the present disclosure.

It is contemplated that the DWDM link 100 may add flat ASE noise within the transmitted signal bandwidth. FIG. 7 illustrates a transceiver noise spectrum $NSR_{TRx}(f)$ 702 and an ASE-to-signal spectrum $NSR_{ASE}(f)$ 704. As shown, the spectrum $NSR_{TRx}(f)$ 702 may be symmetrical around the origin and the spectrum $NSR_{ASE}(f)$ 704 may be flat.

Various embodiments are directed towards shaping the optical signal to be transmitted in the DWDM link 100. In doing so, a desired spectrum $NSR_{ASE}(f)$ may be achieved. The exact shape of the desired spectrum $NSR_{ASE}(f)$ may be of less relevance, as long as the shape is known in advance.

Figure 8:
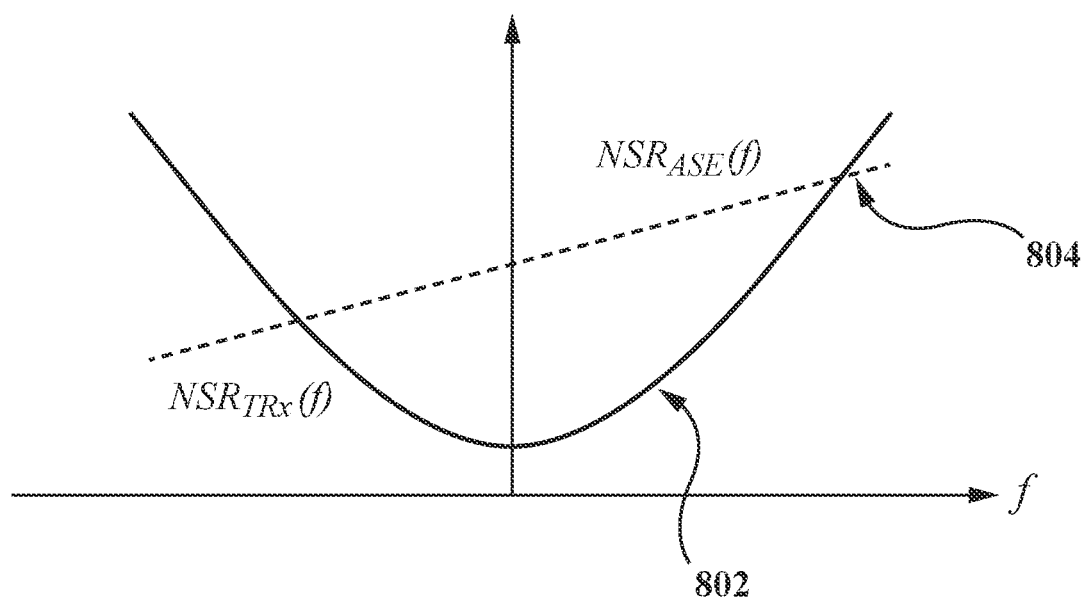
FIG. 8 illustrates a transceiver noise spectrum $NSR_{TRx}(f)$ and a spectrum $NSR_{ASE}(f)$, in accordance with various embodiments of the present disclosure.

Returning to FIG. 1, the wave shaping of the transmitted optical signal may be provided by the first WSS 108-1 when the optical signal from the transmitter is added to the DWDM link 100. In certain embodiments, the controller 120 may provide a control signal to the WSS 108-1 to alter the shape of the optical signal. The wave shaping may be performed by using a filtering technique. The effect of the wave shaping of the optical signal may be observed on the spectrum $NSR_{ASE}(f)$. FIG. 8 illustrates a transceiver noise spectrum $NSR_{TRx}(f)$ 802 and a spectrum $NSR_{ASE}(f)$ 804. As shown, the spectrum $NSR_{TRx}(f)$ 802 may still be symmetrical around the origin and the spectrum $NSR_{ASE}(f)$ 704 may have a tilt.

The receiver 110 may be configured to receive the wave-shaped optical signal affected by the transceiver noise and the ASE noise. The receiver may be configured to compute the total spectrum $NSR_{tot}(f)$ including the ASE noise and the transceiver using equation (3). The transceiver noise spectrum $NSR_{TRx}(f)$ may be represented in terms of total spectrum $NSR_{tot}(f)$ and ASE noise spectrum $NSR_{ASE}(f)$ as:

$$NSR_{TRx}(f) = NSR_{tot}(f) - k(f) NSR_{ASE} \quad (4)$$

where $k(f)$ may be the known noise shaping factor provided by the WSS 108-1. Without losing generality, in certain embodiments, a value of $k(0)=1$ may be set by the controller 120. The ASE noise spectrum $NSR_{ASE}(f)$ may be required to be determined in order to determine the transceiver noise spectrum $NSR_{TRx}(f)$. It is to be noted that the transceiver noise spectrum $NSR_{TRx}(f)$ may be symmetrical about $f=0$. To this end, the controller 120 may define a parameter ε to measure the symmetry error as:

$$\varepsilon = \int_0^{B/2} |NSR_{TRx}(f) - NSR_{TRx}(-f)|^2 df. \quad (5)$$

where B is the optical signal baud rate. Substituting equation (4) in equation (5) and minimizing ε may provide the ASE noise spectrum $NSR_{ASE}(f)$. It is to be noted that how the controller 120 minimizes ε should not limit the scope of present disclosure. Once the ASE noise spectrum $NSR_{ASE}(f)$ is determined, the controller 120 may determine the transceiver noise spectrum $NSR_{TRx}(f)$ using equation (4).

Figure 9:
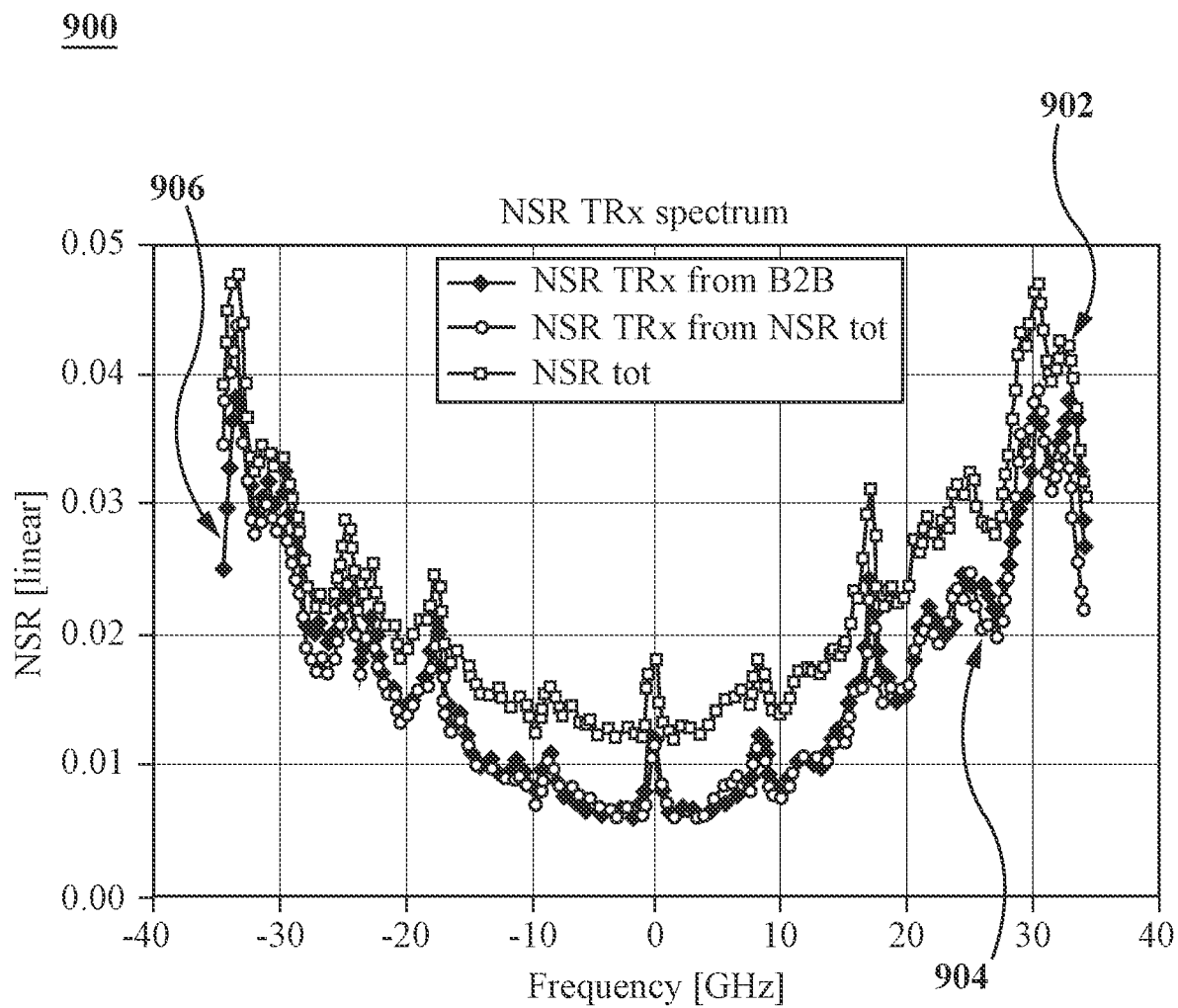
FIG. 9 illustrates a representative experimental outcome corresponding to different noise-to-signal ratios (NSRs), in accordance with various non-limiting embodiments of the present disclosure.

FIG. 9 illustrates a representative experimental outcome 900 corresponding to different NSRs, in accordance with various non-limiting embodiments of the present disclosure. The experimental outcome 900 may be corresponding to a 3 dB tilt provided by the WSS 108-1 to the optical signal. In the representative experimental outcome 900, the curve 902 illustrates a total spectrum $NSR_{tot}(f)$, the curve 904 illustrates a transceiver noise spectrum $NSR_{TRx}(f)$ extracted from the total spectrum $NSR_{tot}(f)$, and curve 906 illustrates transceiver noise spectrum $NSR_{TRx}(f)$ from B2B configuration of FIG. 4A. It may be observed from the representative experimental outcome 900 that the error of the integrated noise within signal bandwidth is about 3%.

Figure 10:
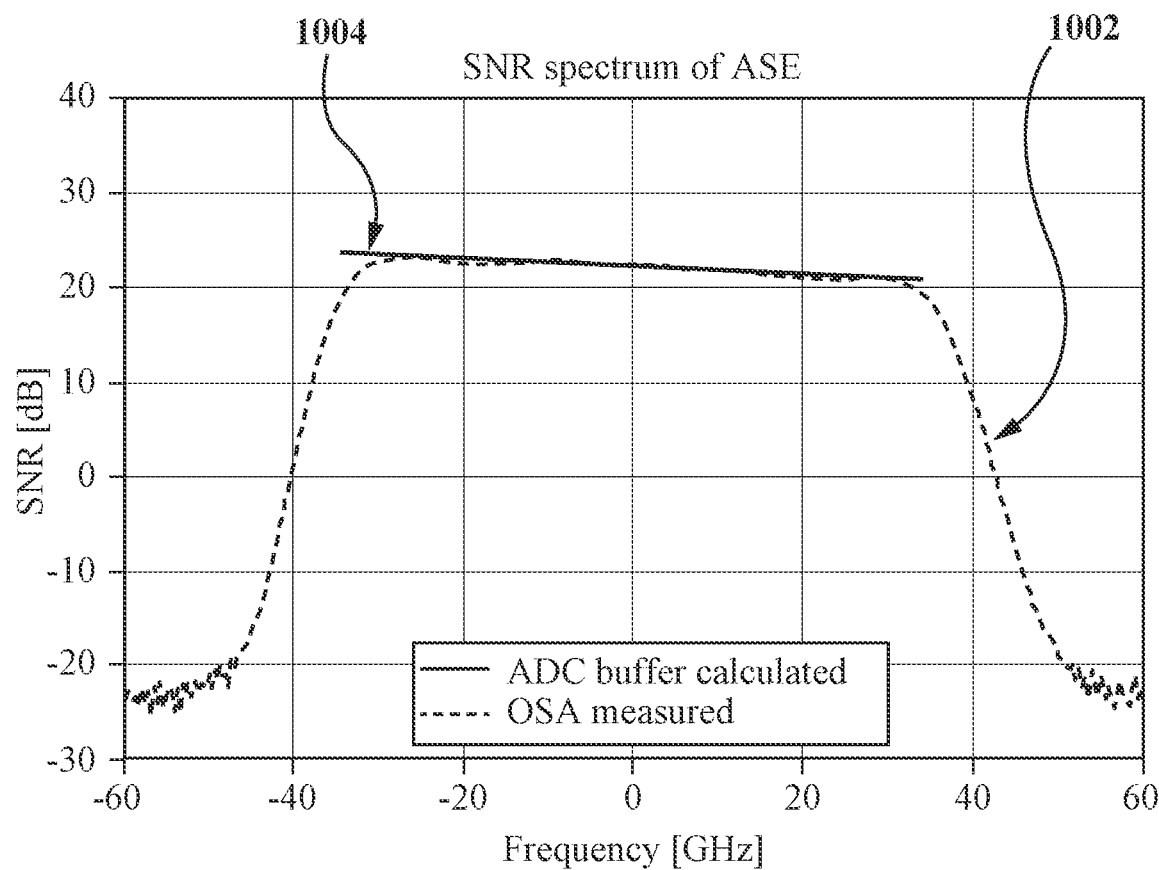
FIG. 10 illustrates a representative experimental outcome corresponding to derived ASE spectrum of SNR, in accordance with various non-limiting embodiments of the present disclosure.

FIG. 10 illustrates a representative experimental outcome 1000 corresponding to derived ASE spectrum of SNR, in accordance with various non-limiting embodiments of the present disclosure. In the representative experimental outcome 1000, curve 1002 illustrates SNR measured by an OSA and curve 1004 illustrates SNR measured in accordance with various embodiments of the present disclosure. As observed, the two curves 1002 and 1004 are closely correlated. Moreover, a performance degradation induced by 3 dB tilt is less than 0.2 dB, therefore various embodiments of the present disclosure may be used for in-service channel in most cases.

Figure 11:
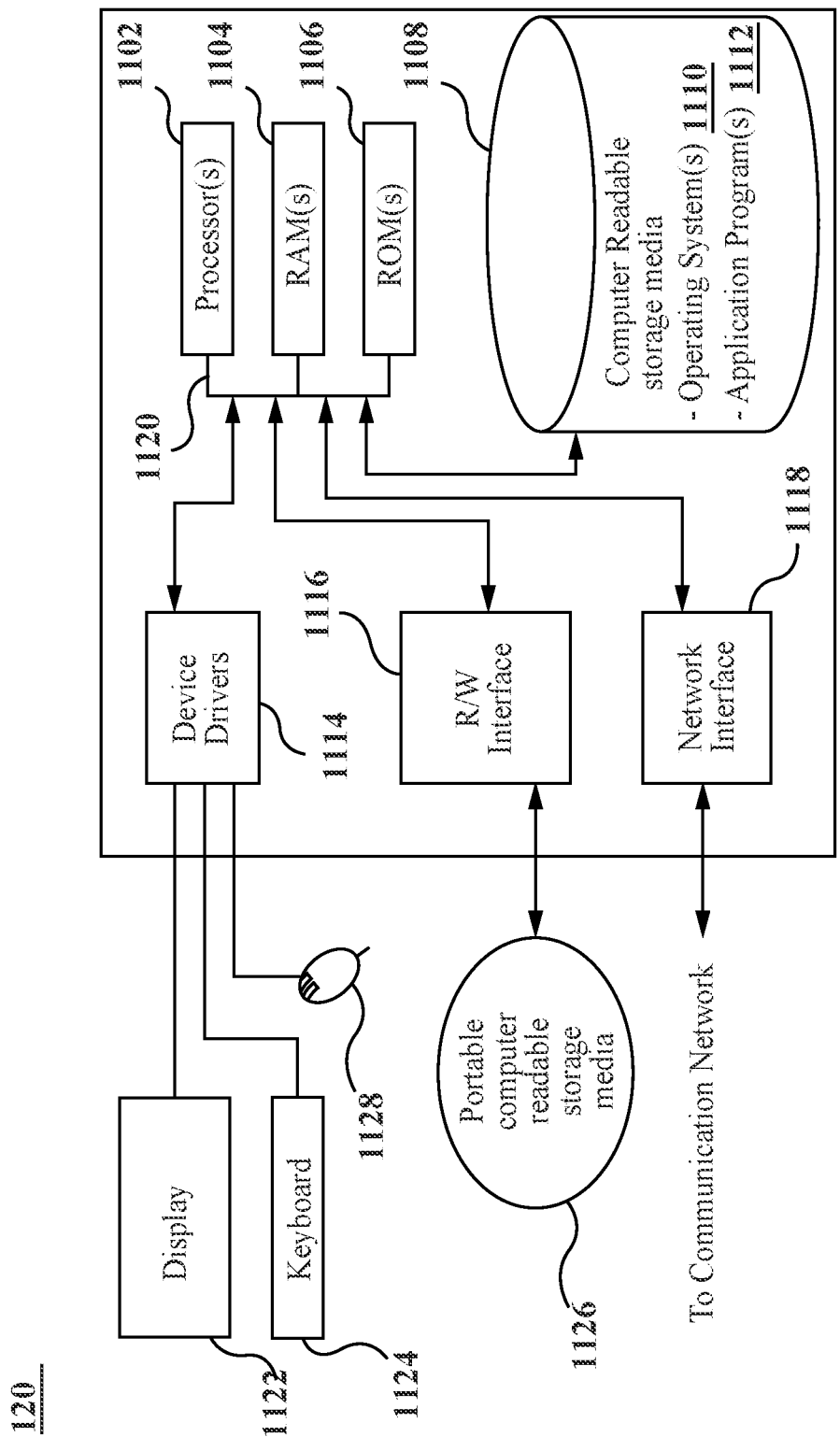
FIG. 11 depicts a high-level block diagram of components of the controller, in accordance with various embodiments of the present disclosure.

FIG. 11 depicts a high-level block diagram of components of the controller 120, in accordance with various embodiments of the present disclosure. It should be appreciated that FIG. 1 provides only an illustration of one implementation of the controller 120 and does not imply any limitations with regard to the environments in which different embodiments may be implemented. Various modifications to the depicted environment may be done to implement the controller 120 without departing from the principles presented herein. The controller 120 may be a server, a desktop computer, a laptop computer, or any device that may be configured to implement the present technology, as should be understood by a person skilled in the art.

As shown, the controller 120 employs one or more different type of processors 1102, one or more computer-readable random access memories (RAMs) 1104, one or more computer-readable read only memories (ROMs) 1106, one or more computer-readable storage media 1108, device drivers 1114, a read/write (R/W) driver interface 1116, a network interface 1118, all interconnected over a communication fabric 1120. The communication fabric 1120 may be implemented by any architecture designed for communicating data and/or control information between processors (such as microprocessors, communications and network processors, etc.), system memory, peripheral devices, and any other hardware components within a system.

The processor 1102 of the controller 120 may include one or more of a CPU, an accelerator, a microprocessor, a GPU, an NPU, an ASIC, a FPGA, a dedicated logic circuitry, a dedicated artificial intelligence processor unit, or combinations thereof. It is to be noted that where the processor 1102 is located in the DWDM optical link 100 should not limit the scope of the present disclosure.

One or more operating systems 1110 and one or more application programs 1112 (examples of application programs may include programming instructions) are stored on one or more of computer-readable storage media 1108 for execution by one or more of the processors 1102 via one or more of respective RAMs 1104 (which typically include a cache memory). In the illustrated embodiment, each of the computer-readable storage media 1108 maybe embodied as a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 1116 reads from and writes to one or more portable computer-readable storage media 1126. The application programs 1112 may be related to the intelligent heterogeneous computing system and stored on one or more of portable computer-readable storage media 1126, read via the respective R/W driver interface 1116 and loaded into the respective computer-readable storage media 1108.

Further, network interface 1118 may be based on a TCP/IP adapter card or wireless communication adapter (such as a wireless communication adapter using OFDMA technology). The application programs 1112 on the controller 120 may be downloaded to the controller 120 from an external computer or external storage device via a communication network (for example, the Internet, a local area network or other wide area network or wireless network) and network interface 1118. From network interface 1118, application programs 1112 may be loaded onto the computer-readable storage media 1108. The controller 120 may connect to routers, firewalls, switches, gateway computers and/or edge servers of the communication network using copper wires, optical fibers, wireless transmission, and the like.

The controller 120 may also include a display screen 1122, a keyboard or keypad 1124, and a computer mouse or touchpad 1128. The device drivers 1114 may interface with display screen 1122 for imaging, with the keyboard or the keypad 1124, with a computer mouse or touchpad 1128, and/or with display screen 1122 (which may be a touch sensitive display) for alphanumeric character entry and user selections. The device drivers 1114, R/W driver interface 1116 and network interface 1118 may comprise hardware and software (stored on the computer-readable storage media 1108 and/or the ROM 1106).

Figure 12:
FIG. 12 illustrates a flowchart of a process for determining spectrum-resolved SNR in an online DWDM optical link, in accordance with various embodiments of the present disclosure.

FIG. 12 illustrates a flowchart of a process 1200 for determining spectrum-resolved SNR in an online DWDM optical link, in accordance with various embodiments of the present disclosure. As shown, the process 1200 commences at step 1202, where the receiver 110 receives an optical signal. The received optical signal includes a transmitted signal affected by noise.

The process 1200 advances to step 1204, where the receiver 110 converts the received optical signal into a digital signal. The receiver 110 may forward the digital signal to the controller 120.

The process 1200 proceeds to step 1206, where the controller 120 process the digital signal to extract the noise affected transmitted signal. The processing may include timing recovery, local oscillator frequency offset compensation (LOFO), carrier phase recovery, and equalization.

The process 1200 advances to step 1208, where the controller 120 decodes the noise-affected transmitted signal and reconstructing an original transmitted signal.

The process 1200 advances to step 1210, where the controller 120 converts the noise-affected transmitted signal into frequency domain noise-affected transmitted signal using Fourier Transformation.

The process 1200 advances to step 1212, where the controller 120 converts the original transmitted signal into frequency domain original transmitted signal.

At step 1214, the controller 120 selects spectrum slices from the frequency domain noise-affected transmitted signal and the frequency domain original transmitted signal.

The process 1200 proceeds to step 1216, where the controller 120 converting the spectrum slices into time domain portions of the noise-affected transmitted signal and the original transmitted signal respectively.

The process 1200 proceeds to step 1218, where the controller 120 correlates the time domain portions of the noise-affected transmitted signal and the original transmitted signal.

Finally at step 1220, the controller 120 determines the spectrum-resolved SNR from the correlation of the time domain portions of the noise-affected transmitted signal and the original transmitted signal.

It is to be understood that the operations and functionality of the controller 120, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for determining spectrum-resolved signal-to-noise ratio (SNR) in an online dense wavelength division multiplexing (DWDM) optical link, the method comprising:
    receiving an optical signal, the received optical signal including a transmitted signal affected by noise;
    converting the received optical signal into a digital signal;
    processing the digital signal to extract the noise affected transmitted signal;
    decoding the noise-affected transmitted signal and reconstructing an original transmitted signal;
    converting the noise-affected transmitted signal into frequency domain noise-affected transmitted signal;
    converting the original transmitted signal into frequency domain original transmitted signal;
    selecting spectrum slices from the frequency domain noise-affected transmitted signal and the frequency domain original transmitted signal;
    converting the spectrum slices into time domain portions of the noise-affected transmitted signal and the original transmitted signal respectively;
    correlating the time domain portions of the noise-affected transmitted signal and the original transmitted signal; and
    determining the spectrum-resolved SNR from the correlation of the time domain portions of the noise-affected transmitted signal and the original transmitted signal.

2. The method of claim 1 further comprising:
    selecting different spectrum slices from the frequency domain noise-affected transmitted signal and the frequency domain original transmitted signal;
    converting the different spectrum slices into different time domain portions of the noise-affected transmitted signal and the original transmitted signal;
    correlating the different time domain portions of the noise-affected transmitted signal and the original transmitted signal;
    determining the spectrum-resolved SNR from the correlation of the different time domain portions of the noise-affected transmitted signal and the original transmitted signal; and
    averaging the spectrum-resolved SNR corresponding to the different spectrum slices and determining the SNR over an entire spectrum of the noise-affected transmitted signal and the original transmitted signal.

3. The method of claim 1, wherein the processing the digital signal includes timing recovery, local oscillator frequency offset compensation (LOFO), carrier phase recovery, and equalization.

4. The method of claim 1, wherein a relationship between the correlation and the spectrum-resolved SNR is given as:

$$\frac{1}{SNR(f)} = \frac{1}{CORR^2(f)} - 1$$

where SNR(f) is the spectrum-resolved SNR and CORR(f) is the correlation between the time domain portions.

5. The method of claim 4, wherein the correlation CORR(f) between the time domain portions is given as:

$$CORR(f) \equiv \frac{\langle E_{tot}(f,t)E_s^*(f,t)\rangle}{\sqrt{\langle |E_{tot}(f,t)|^2\rangle}\sqrt{\langle |E_s(f,t)|^2\rangle}}$$

where $\langle E_{tot}(f,t)E_s^*(f,t)\rangle$ is an expectation operation, $\langle |E_s(f,t)|^2\rangle$ is a power of the time domain portion of the estimated original signal waveform $E_s^*(f,t)$, $\langle |E_{tot}(f,t)|^2\rangle$ is a power of the total signal waveform $E_{tot}(f,t)$.

6. The method of claim 1, wherein in the event that the extracting of the original transmitted signal is affected by symbol-to-error rate, a relationship between the correlation and the spectrum-resolved SNR is given as:

$$\frac{1}{SNR(f, SER)} = \frac{(1-SER)^2}{CORR^2(f, SER)} - 1$$

where SNR(f,SER) is the spectrum-resolved SNR and CORR(f,SER) is the correlation between the time domain portions, and SER is the symbol-to-error rate.

7. The method of claim 1, wherein the noise comprises transceiver noise and DWDM optical link noise.

8. The method of claim 7 further comprising segregating the transceiver noise from the DWDM optical link noise.

9. The method of claim 8, wherein segregating the transceiver noise from the DWDM optical link noise comprises:
    altering a shape of the optical signal resulting in an alteration in the DWDM optical link noise;
    determining the spectrum-resolved SNR based on the altered DWDM optical link noise;
    measuring a symmetry error in the spectrum-resolved SNR;
    based on the symmetry error determining the transceiver noise.

10. A system for determining spectrum-resolved signal-to-noise ratio (SNR) in an online dense wavelength division multiplexing (DWDM) optical link, the system comprising:
    a non-transitory memory element having instructions thereon;

at least one processor coupled to the non-transitory memory element and which execute the instructions to cause the at least one processor to:
  receive a digital signal corresponding to an optical signal, the optical signal including a transmitted signal affected by noise;
  process the digital signal to extract the noise affected transmitted signal;
  decode the noise-affected transmitted signal and reconstruct an original transmitted signal;
  convert the noise-affected transmitted signal into frequency domain noise-affected transmitted signal;
  convert the original transmitted signal into frequency domain original transmitted signal;
  select spectrum slices from the frequency domain noise-affected transmitted signal and the frequency domain original transmitted signal;
  convert the spectrum slices into time domain portions of the noise-affected transmitted signal and the original transmitted signal respectively;
  correlate the time domain portions of the noise-affected transmitted signal and the original transmitted signal; and
  determine the spectrum-resolved SNR from the correlation of the time domain portions of the noise-affected transmitted signal and the original transmitted signal.

11. The system of claim 10 wherein the at least one processor is further configured to:
  select different spectrum slices from the frequency domain noise-affected transmitted signal and the frequency domain original transmitted signal;
  convert the different spectrum slices into different time domain portions of the noise-affected transmitted signal and the original transmitted signal;
  correlate the different time domain portions of the noise-affected transmitted signal and the original transmitted signal;
  determine the spectrum-resolved SNR from the correlation of the different time domain portions of the noise-affected transmitted signal and the original transmitted signal; and
  average the spectrum-resolved SNR corresponding to the different spectrum slices and determining the SNR over an entire spectrum of the noise-affected transmitted signal and the original transmitted signal.

12. The system of claim 10, wherein the processing the digital signal includes timing recovery, local oscillator frequency offset compensation (LOFO), carrier phase recovery, and equalization.

13. The system of claim 10, wherein a relationship between the correlation and the spectrum-resolved SNR is given as:

$$\frac{1}{SNR(f)} = \frac{1}{CORR^2(f)} - 1$$

where SNR(f) is the spectrum-resolved SNR and CORR(f) is the correlation between the time domain portions.

14. The system of claim 13, wherein the correlation CORR(f) between the time domain portions is given as:

$$CORR(f) \equiv \frac{\langle E_{tot}(f,t) E_s^*(f,t) \rangle}{\sqrt{\langle |E_{tot}(f,t)|^2 \rangle} \sqrt{\langle |E_s(f,t)|^2 \rangle}}$$

where $\langle E_{tot}(f,t) E_s^*(f,t) \rangle$ is an expectation operation, $\langle |E_s(f,t)|^2 \rangle$ is a power of the time domain portion of the estimated original signal waveform $E_s^*(f,t)$, $\langle |E_{tot}(f,t)|^2 \rangle$ is a power of the total signal waveform $E_{tot}(f,t)$.

15. The system of claim 10, wherein in the event that the extracting of the original transmitted signal is affected by symbol-to-error rate, a relationship between the correlation and the spectrum-resolved SNR is given as:

$$\frac{1}{SNR(f, SER)} = \frac{(1-SER)^2}{CORR^2(f, SER)} - 1$$

where SNR(f,SER) is the spectrum-resolved SNR and CORR(f,SER) is the correlation between the time domain portions, and SER is the symbol-to-error rate.

16. The system of claim 10, wherein the noise comprises transceiver noise and DWDM optical link noise.

17. The system of claim 16, wherein the at least one processor is further configured to segregate the transceiver noise from the DWDM optical link noise.

18. The system of claim 17, wherein segregating the transceiver noise from the DWDM optical link noise comprises:
  altering a shape of the optical signal resulting in an alteration in the DWDM optical link noise;
  determining the spectrum-resolved SNR based on the altered DWDM optical link noise;
  measuring a symmetry error in the spectrum-resolved SNR;
  based on the symmetry error determining the transceiver noise.

* * * * *